United States Patent
Asai et al.

(10) Patent No.: US 9,691,335 B2
(45) Date of Patent: Jun. 27, 2017

(54) MEMORY CONTROL DEVICE, MOBILE TERMINAL, AND COMPUTER-READABLE RECORDING MEDIUM

(71) Applicant: Sharp Kabushiki Kaisha, Osaka-shi, Osaka (JP)

(72) Inventors: Junki Asai, Osaka (JP); Fumitaka Seki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 14 days.

(21) Appl. No.: 14/422,028

(22) PCT Filed: Aug. 29, 2013

(86) PCT No.: PCT/JP2013/073160
§ 371 (c)(1),
(2) Date: Feb. 17, 2015

(87) PCT Pub. No.: WO2014/038468
PCT Pub. Date: Mar. 13, 2014

(65) Prior Publication Data
US 2015/0221261 A1 Aug. 6, 2015

(30) Foreign Application Priority Data

Sep. 7, 2012 (JP) ................................ 2012-197795

(51) Int. Cl.
| | | |
|---|---|---|
| G06T 1/60 | (2006.01) | |
| G09G 3/36 | (2006.01) | |
| G09G 3/20 | (2006.01) | |
| G09G 5/393 | (2006.01) | |
| G06F 13/16 | (2006.01) | |
| G09G 5/00 | (2006.01) | |
| G09G 5/395 | (2006.01) | |

(52) U.S. Cl.
CPC ........... G09G 3/36 (2013.01); G06F 13/1668 (2013.01); G06T 1/60 (2013.01); G09G 3/20 (2013.01);
(Continued)

(58) Field of Classification Search
CPC .................. G06F 13/1668; G06T 1/60; G09G 2320/0247; G09G 2340/14; G09G 2350/00; G09G 2360/08; G09G 2360/12; G09G 2360/125; G09G 3/20; G09G 3/36; G09G 3/3611; G09G 5/001; G09G 5/393; Y02B 60/1228
See application file for complete search history.

(56) References Cited

U.S. PATENT DOCUMENTS 3,905,039 A * 9/1975 Yumde .................... H04N 5/915
348/23
7,318,002 B2 * 1/2008 Kulidjian ............... G09G 3/006
348/E17.005
(Continued)

FOREIGN PATENT DOCUMENTS

| JP | 08-335150 A | 12/1996 |
|---|---|---|
| JP | 2005-124167 A | 5/2005 |
| JP | 2011-041290 A | 2/2011 |

*Primary Examiner* — Sing-Wai Wu
(74) *Attorney, Agent, or Firm* — Keating & Bennett, LLP (57) ABSTRACT

The present invention includes a write-in start position control section (36) that performs a process of shifting, by a given shifting amount, a start position of a write-in operation to the frame memory (31), when the write-in operation is started, the given shifting amount being predetermined so as not to exceed a capacity reserved in advance in the frame memory.

10 Claims, 7 Drawing Sheets

(52) U.S. Cl.
CPC ........... *G09G 3/3611* (2013.01); *G09G 5/001* (2013.01); *G09G 5/393* (2013.01); *G09G 5/395* (2013.01); *G09G 2320/0247* (2013.01); *G09G 2340/14* (2013.01); *G09G 2350/00* (2013.01); *G09G 2360/08* (2013.01); *G09G 2360/12* (2013.01); *G09G 2360/125* (2013.01); *Y02B 60/1228* (2013.01)

(56) References Cited

U.S. PATENT DOCUMENTS

| | | | |
|---|---|---|---|
| 2004/0135789 A1* | 7/2004 | Yu | G09G 5/399 345/531 |
| 2005/0105001 A1 | 5/2005 | Yui et al. | |
| 2006/0034326 A1 | 2/2006 | Anderson et al. | |
| 2006/0161691 A1 | 7/2006 | Katibian et al. | |
| 2006/0164424 A1 | 7/2006 | Wiley et al. | |
| 2006/0168496 A1 | 7/2006 | Steele et al. | |
| 2006/0171414 A1 | 8/2006 | Katibian et al. | |
| 2006/0179164 A1 | 8/2006 | Katibian et al. | |
| 2006/0179384 A1 | 8/2006 | Wiley et al. | |
| 2006/0288133 A1 | 12/2006 | Katibian et al. | |
| 2007/0159490 A1* | 7/2007 | De Greef | G09G 5/393 345/546 |
| 2008/0036631 A1 | 2/2008 | Musfeldt | |
| 2008/0211962 A1* | 9/2008 | Murata | H04N 7/0105 348/500 |

\* cited by examiner

MEMORY CONTROL DEVICE, MOBILE TERMINAL, AND COMPUTER-READABLE RECORDING MEDIUM

TECHNICAL FIELD

The present invention relates to a memory control device that writes, to a frame memory, data transferred from a host processor, reads out the data written in the frame memory and then transfers the data to a display panel such as an LCD (Liquid Crystal Display), a mobile terminal including the memory control device, a memory control program, and a computer-readable storage medium storing the memory control program.

BACKGROUND ART

When image data is to be transferred from a host processor (hereinafter, referred to simply as a "host") to a display panel such as an LCD, generally, the image data is outputted to the display panel after temporarily stored in a frame memory (hereinafter, referred to simply as a "memory") of an LCDC (LCD Controller). This makes it unnecessary to transfer the image data from the host in a case where there is no update of display data.

However, in seamless processing such as video reproduction, input (writing) of the image data from the host to the LCDC (a frame buffer) is substantially concurrently carried out with output (reading) of the image data from the LCDC to the display panel.

Then, when a difference between transfer rates of the image data cannot be compensated, incomplete image data that is being stored in the memory is outputted to the display panel. This is an overtaking phenomenon, which is called tearing. Further, this output of the incomplete image data to the display panel in a case where tearing occurs causes flickers in image display.

As a conventional technique for suppressing such tearing, Patent Literature 1 discloses a frame rate conversion device. This frame rate conversion device includes memory control means for inputting/outputting data to/from a common memory, overtaking prediction means for predicting a frame where overtaking of data input to/output from the memory occurs, and memory writing control means for stopping writing to the memory in a case where the occurrence of overtaking is predicted by the overtaking prediction means.

Meanwhile, Patent Literature 2 discloses a method for updating a buffer. This method is intended to convey timing information through a communication link between a first processor and a second processor. In this method, the communication link is in a pause mode and a time event is scheduled at the first processor for conveying the timing information to the second processor. Moreover, this method includes the steps of initiating a link wake-up by the first processor at the time when the time event occurs, detecting the link wake-up by the second processor, and synchronizing the first processor and the second processor in terms of the conveyed timing information by using the link wake-up timing that has been detected by the second processor.

Further, Patent Literature 3 discloses a method for avoiding a disturbance in an image due to overtaking of writing/reading in a FI-FO (First in-First out) video memory. In this method, the overtaking phenomenon is avoided by a single device, in an arrangement in which control signals for writing and reading are shifted from each other by at least a storage unit and thereby operation addresses for the writing and reading are set apart from each other so that respective operations of writing and reading are executed virtually in separate memory areas.

CITATION LIST

Patent Literature 1
Japanese Patent Application Publication Tokukai No. 2005-124167 (May 12, 2005)
Patent Literature 2
Japanese Patent Application Publication Tokukai No. 2011-41290 (Feb. 24, 2011)
Patent Literature 3
Japanese Patent Application Publication Tokukaihei No. 8-335150 (Dec. 17, 1996)

SUMMARY OF INVENTION

Technical Problem

However, techniques disclosed in Patent Literatures 1 and 2 have the following problems.

In the techniques disclosed in Patent Literatures 1 and 2, as described above, both of writing to and reading from a frame buffer only for a single frame are carried out concurrently. Accordingly, it was not possible to suspend a time for reading for display output by use of the frame buffer for display. Hence, in the techniques as described in Patent Literatures 1 and 2, there were only the following choices:
(1) to wait to start writing until a timing at which it was predicted that tearing would not occur; or
(2) to abandon writing in a case where writing was to be started at a timing at which it was predicted that tearing would occur.

For example, the case of the above (1) has the following problem. That is, in the case of the above (1), it is necessary to wait to carry out writing until a safe time comes, every time a host updates image data for display. Then, in the worst case, there may occur a waiting time for one frame at the maximum. Further, as an adverse effect of this case, the frame buffer at the host cannot be set open, until a data transfer for update of the image data ends. Thus, even if the host is arranged to have a double buffer structure, a waiting time is required before the host starts making image data following the next image data. This consequently becomes a cause of a drop frame. Moreover, even in a case where there is no update of next image data, an operation of the host cannot be suspended until data transfer ends. This results in unnecessary power consumption for a certain period of time.

Meanwhile, in the case of the above (2), the writing can only be abandoned and thus, a drop frame occurs.

The inventors of the present invention have made a novel finding that as a method to solve the above problems, a method for avoiding tearing by delaying a start position of a read-out operation is conceivable. However, the inventors also have found for the first time that disadvantageously, this method might change a vertical synchronization signal pulse period and a vertical back porch period for the read-out operation and consequently cause a malfunction of a subsequent circuit, particularly a malfunction of an LCD driver circuit.

Note that such a problem regarding a change in a VP+VB period as described above is discussed in none of Patent Literatures 1 to 3.

The present invention is attained in view of the above problems. An object of the present invention is to provide a memory control device and the like that is capable of (i) avoiding a drop frame, (ii) reducing an unnecessary power consumption, and (iii) avoiding the occurrence of tearing as well as a change in a vertical synchronization signal pulse period and a vertical back porch period.

Solution to Problem

In order to solve the above problem, a memory control device in accordance with one embodiment of the present invention includes: a memory control device that performs (a) a write-in operation for writing, to a frame memory, data transferred from a host and (b) a read-out operation for reading the data written in the frame memory and then transferring this data to a display control section, and the memory control device including, a write-in start position control section performing a process of shifting, by a given shifting amount, a start position of the write-in operation to the frame memory, the given shifting amount being predetermined so as not to exceed a capacity reserved in advance in the frame memory in a case where (i) a read-out period from a start to an end of the read-out operation is different in length from a write-in period from a start to an end of the write-in operation and (ii) the write-in operation is started.

Advantageous Effects of Invention

The memory control device in accordance with one embodiment of the present invention makes it possible to (i) avoid a drop frame, (ii) reduce an unnecessary power consumption, and (iii) avoid the occurrence of tearing as well as a change in a period of a sum of a vertical synchronization signal pulse period and a vertical back porch period.

BRIEF DESCRIPTION OF DRAWINGS

FIG. 3 is a timing chart illustrating an example operation of the above memory control device. (a) of FIG. 3 shows an example operation of a case where a time point of a start of a write-in operation is not in a dangerous period; (b) of FIG. 3 shows an example case where a time point of a start of a write-in operation is in a dangerous period; (c) of FIG. 3 shows an example case where a time point of a start of a write-in operation is in a period after a time point of an end of a dangerous period and before a time point of an end of a read-out operation; and (d) of FIG. 3 shows an example case where data transfer from a host to an LCD controller is started, substantially at a scheduled time point for starting a read-out operation.

DESCRIPTION OF EMBODIMENTS

The following discusses an embodiment of the present invention with reference to FIGS. 1 to 7. Descriptions of some configurations except configurations respectively discussed in specific sections below are omitted as necessary. In a case where such a configuration whose description is omitted is described in another section, the configuration described in the another section is the same as the configuration whose description is omitted. Furthermore, for convenience of explanation, members respectively having identical functions as those described in respective sections are given the same reference signs, and explanations thereof are omitted as appropriate.

[Image Transfer System 1]

Figure 1:
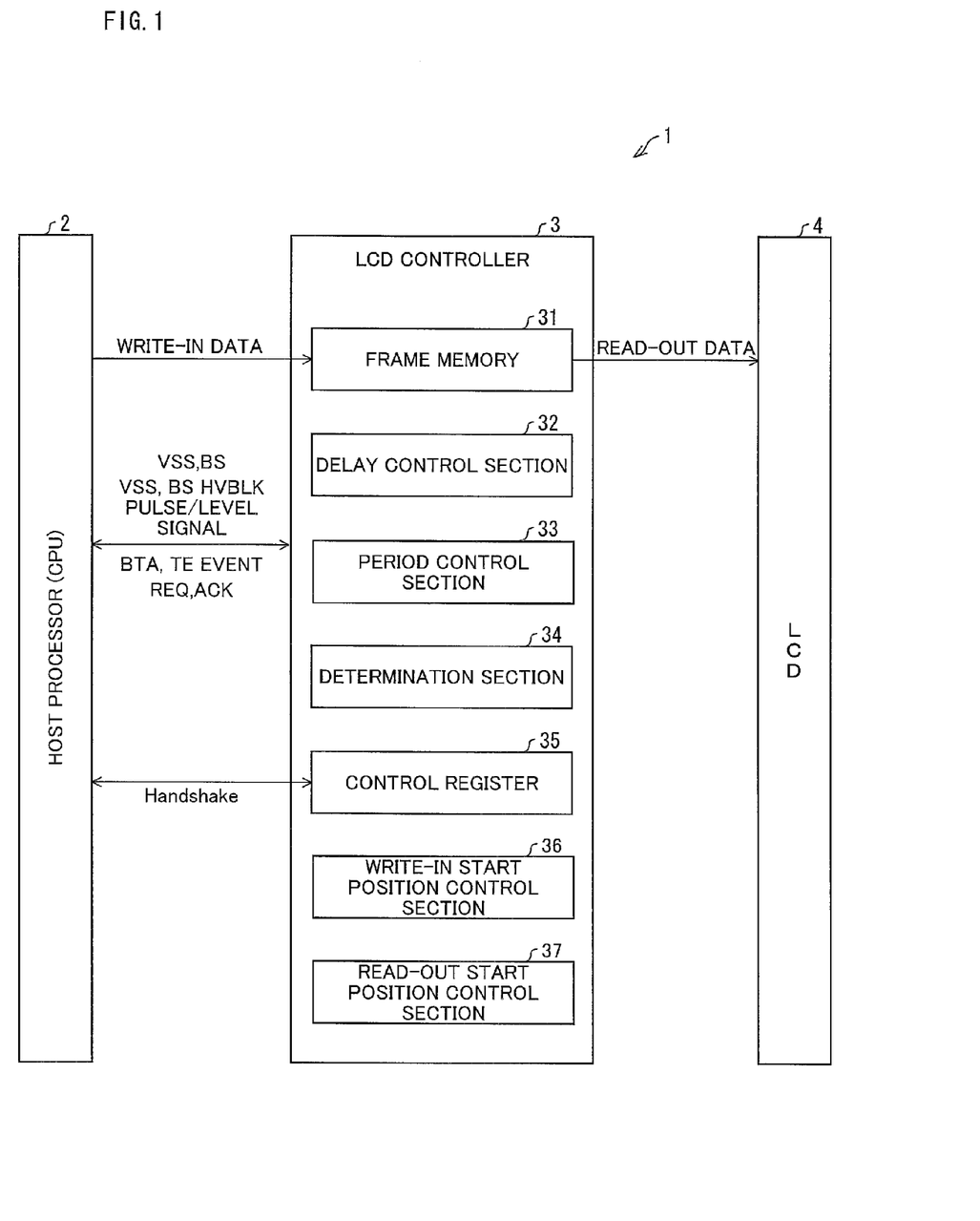
FIG. 1 is a block diagram illustrating one embodiment of a memory control device of the present invention.

First, the following discusses an image transfer system 1 in accordance with an embodiment of the present invention, with reference to FIG. 1. FIG. 1 is a block diagram illustrating a configuration of the image transfer system 1.

As illustrated in FIG. 1, the image transfer system 1 includes a host processor 2, an LCD controller 3 and an LCD 4. The image transfer system 1 of the present embodiment performs a write-in operation for writing, to a frame memory 31 described later, image data (data) that is transferred from the host processor 2, and a read-out operation for reading the image data written in the frame memory 31 and transferring thus read image data to the LCD 4. In the present specification, an embodiment of the image transfer system 1 excluding the LCD 4 corresponds to an embodiment of a memory control system of the present invention.

(Host Processor 2)

The host processor 2 is a host processor (CPU; Central Processing unit) of a device itself (such as a mobile terminal 10 of FIG. 2). The host processor 2 is in charge of general control (processing) of the device itself as well as supplying (or transferring), to the LCD controller 3, image data to be transferred to the LCD 4, various signals such as REQ (Request) signals, control commands such as handshake flags and BTAs (Bus Turnaround), various packets such as VSS (Vertical Sync Start) packets and BS (Blanking Start) packets, and the like.

(LCD Controller 3)

The LCD controller 3 performs various types of processings such as an operation of writing, to the frame memory 31, image data that is transferred from the host processor 2 which is an input/output mechanism of the image data, and an operation of reading the image data from the frame memory 31 and transferring thus read image data to the LCD 4.

As shown on FIG. 1, the LCD controller 3 includes at least the frame memory 31, a delay control section 32 (delay section), a period control section (a period adjusting section) 33, a determination section 34, a control register 35, a writing start position control section 36 and a reading start position control section 37.

(Frame Memory 31)

Figure 5:
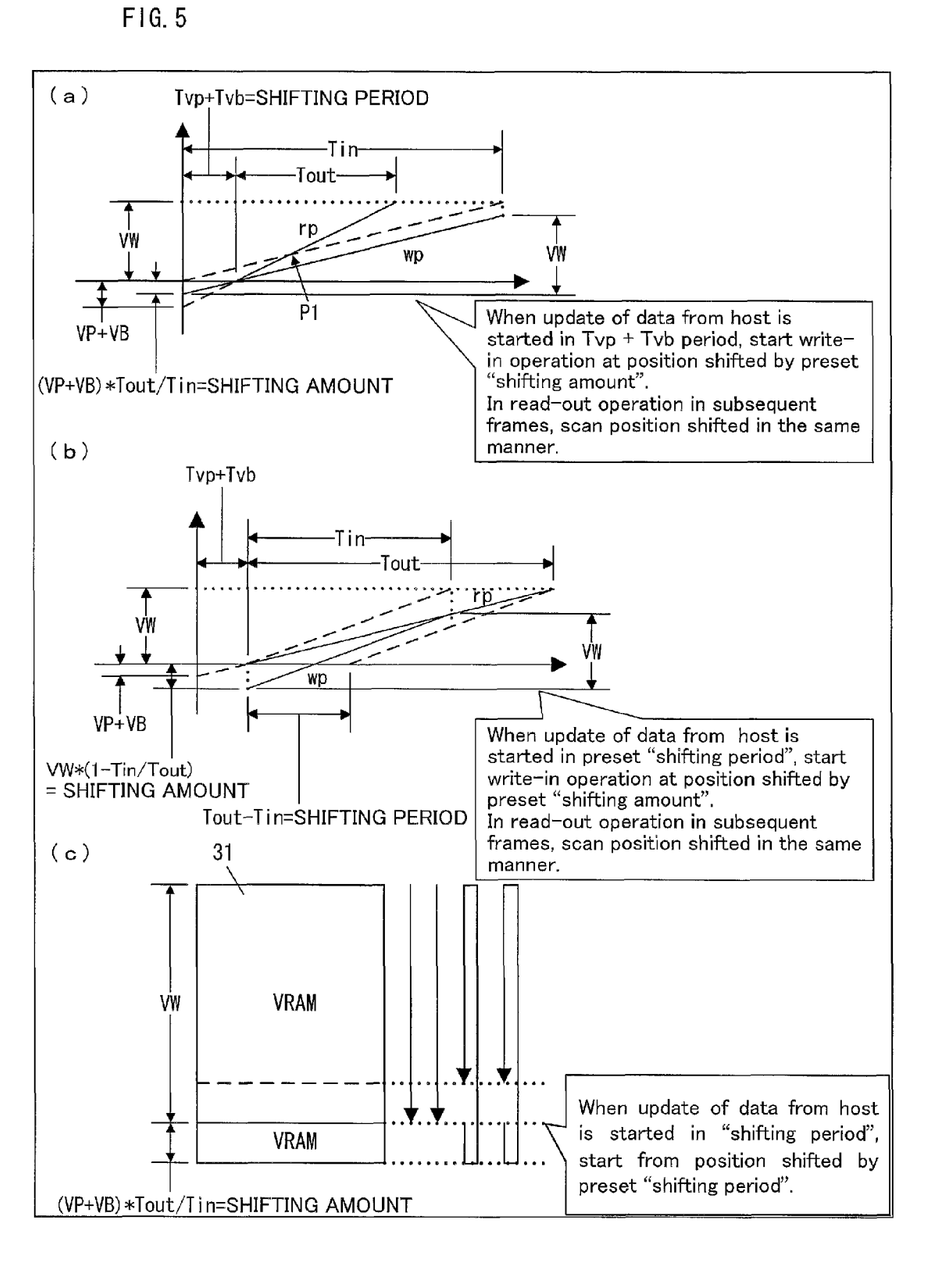
FIG. 5 is a diagram illustrating a shifting amount in a case where a start position of a write-in operation to a frame memory is shifted. (a) of FIG. 5 shows a case where Tin>Tout; (b) of FIG. 5 shows a case where Tin<Tout; and (c) of FIG. 5 shows an increment in the frame memory for avoidance of tearing.

The frame memory 31 is an image memory where at least image data for 1 frame can be stored. This image data is data transferred from the host processor 2. Note that a storage capacity of the frame memory 31 of the present embodiment is at least extended by a given shifting amount described later, beyond a storage capacity of the image data for 1 frame (See (c) of FIG. 5).

(Delay Control Section 32)

The delay control section 32 delays a time point of a start of faster one of a write-in operation and a read-out operation by a given delay period (or an "output delay period") described later, in a case where a time point of a start of the write-in operation is determined, by the determination section 34 described later, to be in a predetermined dangerous period described later. Here, a read-out period Tout means a period from a start to an end of the read-out operation. On the other hand, a write-in period Tin means a period from the start to an end of the write-in operation.

(Period Control Unit 33)

Figure 4:
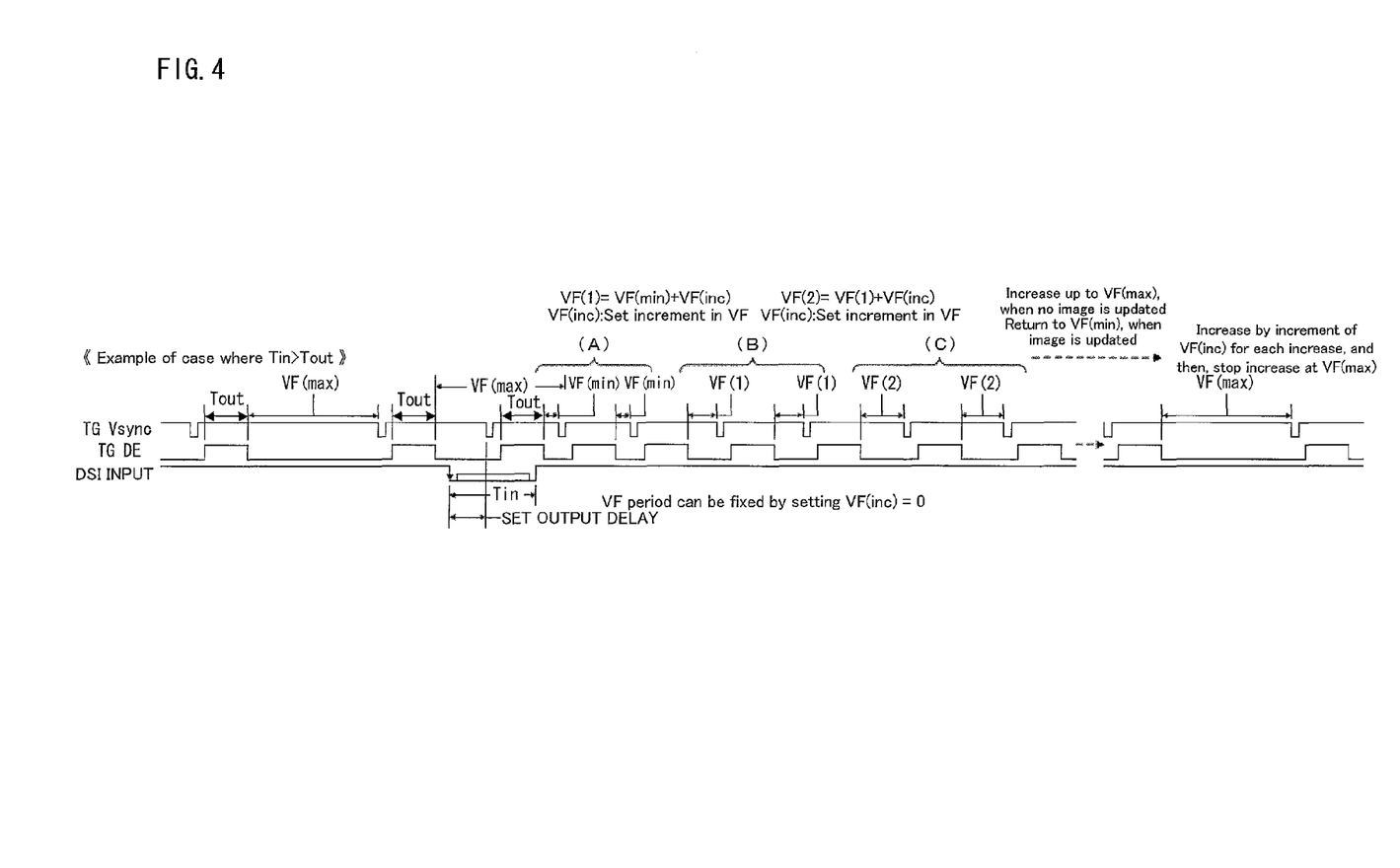
FIG. 4 is a timing chart related to an operation of the above memory control device, illustrating an example of an automatic pause drive operation.

The following discusses an operation of the period control section 33 with reference to FIGS. 1 and 4. FIG. 4 is a timing chart illustrating an example operation of an automatic pause drive.

The period control section 33 adjusts a length of a front porch period (a set VP period, a vertical front porch period) per frame period for the read-out operation of the image data. Note that an operation of the period control section 33 will be detailed later. Here, the "front porch period" means a period from a start of a vertical blanking period to a start of a vertical synchronizing signal.

The period control section 33 of the present embodiment is arranged such that, unless the image data of the host processor 2 is updated, the period control section 33 can adjust a front porch period VF(n) described later so that the VF period is increased by VF(inc) per VF(step) frame period in a range of the minimum VF(min) to the maximum VF(max). On the other hand, the period control section 33 of the present embodiment is arranged to shorten the front porch period VF(n) back to the minimum VF(min) in a case where the image data of the host processor 2 is updated. Note that, when VF(inc)=0, the set VF period can always have a fixed value for each frame.

More specifically, as illustrated in FIG. 4, the length of the "front porch period" can be adjusted so that a relation expressed by VF(n)=VF(n−1)+VF(inc) [where: n is an integer; and VF(inc) is an increased length of VF] exists. The VF(step) is the number of successive outputs per frame of a fixed VF(n).

For example, (A) of FIG. 4 shows a case where a relation of VF(0)=VF(min) is fixed and VF(step)=2. Accordingly, the front porch period of VF(min) is outputted 2 times successively.

Moreover, (B) of FIG. 4 shows a case where a relation of VF(1)=VF(0)+VF(inc)=VF(min)+VF(inc) is fixed and VF(step)=2. Accordingly, the front porch period of VF(1) is outputted 2 times successively.

Further, (C) of FIG. 4 shows a case where a relation of VF(2)=VF(1)+VF(inc) is fixed and VF(step)=2. Accordingly, the front porch period of VF(2) is outputted 2 times successively. Note that, when VF(inc)=0, the VF period always has a fixed value for each frame.

(Determination Section 34)

The determination section 34 performs various determination processes. In the various determination processes, it is determined (i) whether or not a time point of the start of the write-in operation is in a dangerous period, in a case where the read-out period Tout is different in length from the write-in period Tin; (ii) whether or not the time point of the start of the write-in operation is either at a time point of a start of the dangerous period or between a time point of an end of the dangerous period and a time point of the end of the read-out operation; (iii) whether or not the time point of the start of the write-in operation is in a shifting period described later (or every time the write-in operation is started); and so forth.

(Control Register 35)

The control register 35 stores various control commands from the host processor 2 and sends thus stored commands to the host processor 2. The control commands encompass various data used for parameter setting in each section (circuit), for example, an image size, a line size, a frequency, a transfer waiting time, and a specified value for calculating a dangerous period, and so on. An example of a control command that the control register 35 transfers to the host processor 2 encompasses a handshake flag described later.

(Write-in Start Position Control Section 36)

The write-in start position control section 36 performs, as described later, a process to set, to a next read-out start position, a position that is shifted by a given shifting amount from a write-in start position in the frame memory 31.

(Read-Out Start Position Control Section 37)

When the write-in start position control section 36 has performed a process to shift by the above shifting amount the write-in start position for writing to the frame memory 31, the read-out start position control section 37 performs, as described later, a process for starting the read-out operation from a position that is the same as a write-in operation start position shifted in the above process in the frame memory 31. This allows avoiding tearing, and also avoiding the occurrence of a situation in which the image data to be read-out has not been stored at the start position of the read-out operation carried out with respect to the frame memory 31.

(LCD 4)

The LCD 4 displays the image data that has been transferred via the LCD controller 3 from the host processor 2.

The LCD 4 of the present embodiment is, for example, a liquid crystal panel that is made by use of an oxide semiconductor (hereinafter, referred to as an "oxide semiconductor liquid crystal panel"; an example of an oxide is an oxide containing indium, gallium, and zinc).

[Featuring Operation of Image Transfer System 1]

(In Case where Write-in Period Tin>Read-Out Period Tout)

Figure 3:
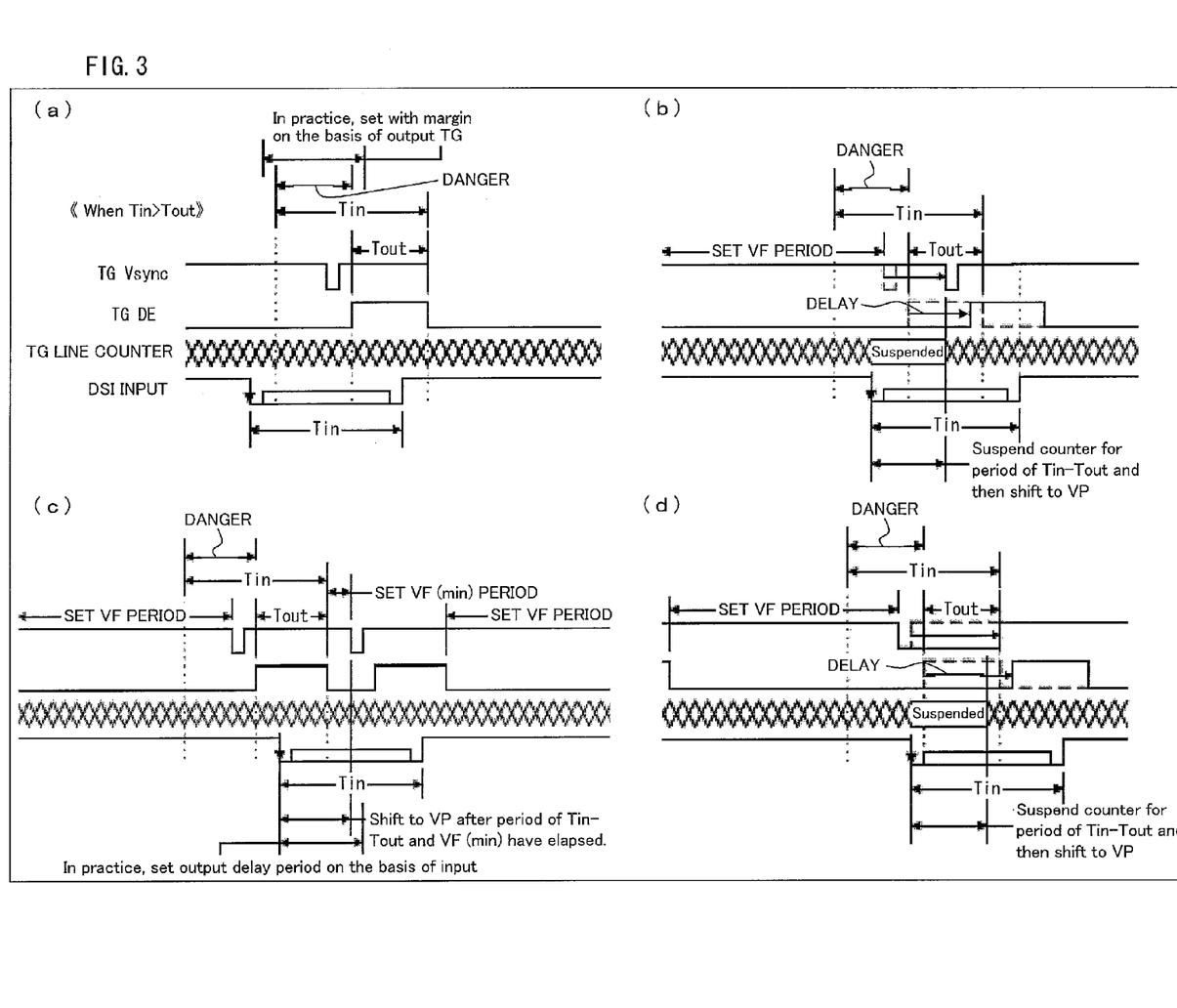
Figure 6:
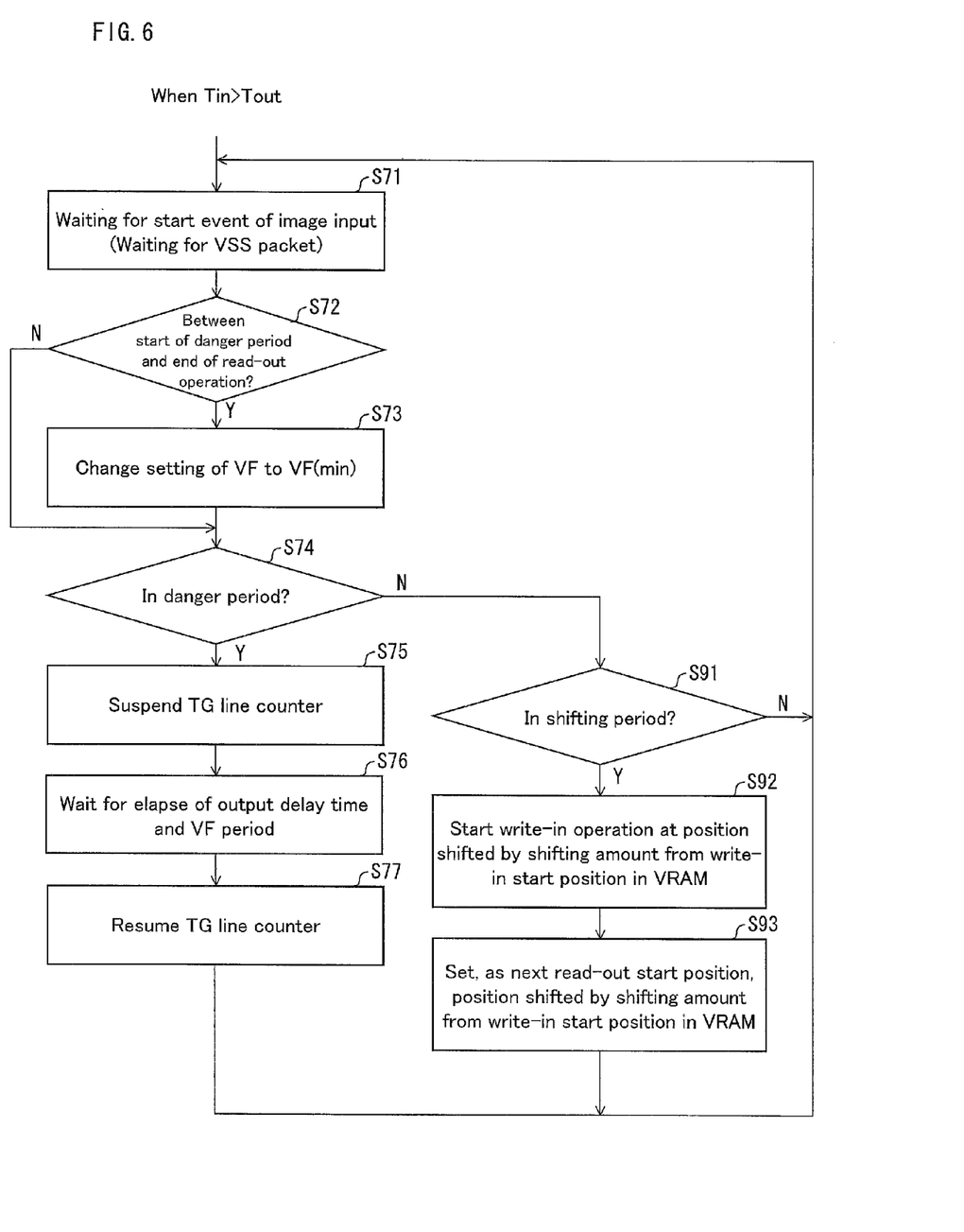
FIG. 6 is a flowchart illustrating an example featuring operation of the above memory control device in a case where Tin>Tout.

Next, the following discusses a featuring operation of the image transfer system 1 in a case where the write-in period Tin is longer than the read-out period Tout, with reference to FIGS. 3, 5 and 6. Before such a featuring operation is discussed, terms important in the following description of the operation are defined first.

The "dangerous period" (indicated as "DANGER" in drawings) is a period that is predetermined in accordance with at least a difference between the read-out period Tout and the write-in period Tin, with reference to the time point of the end of the read-out operation. In consideration of a case where the dangerous period=(the difference between the read-out period Tout and the write-in period Tin)+(a given margin), the above definition of the "dangerous period" has the wording "at least". However, note that, for simplification, the following description is provided on an assumption that the dangerous period=|the read-out period Tout−the write-in period Tin|=the write-in period Tin−the read-out period Tout.

An "(output) delay time" is a period that is predetermined in accordance with the difference between the read-out period Tout and the write-in period Tin. Preferably, the delay period is equal to or longer than the difference between the read-out period Tout and the write-in period Tin. For example, the "delay period" may be arranged so that the "delay period"=|the read-out period Tout−the write-in period Tin|+(a given margin)=the write-in period Tin−the read-out period Tout+(the given margin). For simplification, the following description is provided on an assumption that the "delay period"=|the read-out period Tout−the write-in period Tin|=the write-in period Tin−the read-out period Tout.

Further, for the convenience of explanation, the "shifting period" is defined as a period in which it is highly likely that tearing occurs but which period is distinguished from the dangerous period. This "shifting period" is a period that is predetermined in accordance with either the difference between the read-out period and the write-in period or a period of a sum of a vertical synchronization signal pulse period and a vertical back porch period (hereinafter, referred to simply as a "VP+VB period") of the read-out operation. More specifically, in a case where a speed of the read-out operation is faster than a speed of the write-in operation as in the present embodiment, the "shifting period" is set to the VP+VB period (See (a) of FIG. 5).

(Flow of (i) Determining Whether or not it is in Dangerous Period and (ii) Delay Control)

FIG. 3 is a timing chart of an example operation of the image transfer system 1.

(a) of FIG. 3 illustrates an example operation of a case where the time point of the start of the write-in operation (a time point indicated by a position pointed by a downward arrow of a DSI input in (a) of FIG. 3, or a time point at which information described later is received which information is to be always transferred in advance of the write-in operation of the image data) is not in the dangerous period. On the other hand, (b) of FIG. 3 illustrates an example operation of a case where the time point of the start of the write-in operation is in the dangerous period.

The example in (b) of FIG. 3 shows an example operation of a case where the speed of the read-out operation is faster than the speed of the write-in operation (a case where the write-in period Tin>the read-out period Tout). In a case where the determination section 34 determines that the time point of the start of the write-in operation is in the dangerous period in the case of (b) of FIG. 3, the delay control section 32 of the present embodiment temporarily suspends, for the above delay period, a line counter that generates a line address used at the time when the image data is transferred to the LCD controller 3. This delays the time point of the start of the read-out operation [a time point at which a pulse indicated by "TG DE (Data Enable of Timing Generator)" rises].

As a result, the time point of the start of the read-out operation is delayed by a given delay period that includes at least a period substantially corresponding to the difference between the read-out period Tout and the write-in period Tin, that is, the difference=|the read-out period Tout−the write-in period Tin|, in a case where the speed of the read-out operation is faster than the write-in operation. Then, the start of the read-out operation is avoided in the period in which it is highly likely that tearing occurs.

(Flow in Case where Time Point of Start of Write-in Operation is in Period after Time Point of End of Dangerous Period and Before Time Point of End of Read-Out Operation)

(c) of FIG. 3 illustrates an example operation of a case where the time point of the start of the write-in operation is in a period after the time point of the end of the dangerous period and before the end position of the read-out operation.

When the determination section 34 determines that the time point of the start of the write-in operation is in the period after the time point of the end of the dangerous period and before the time point of the end of the read-out operation of preceding image data of a preceding frame of the image data, the period control section 33 illustrated in FIG. 1 adjusts the length of the front porch period (the set VF period) so that the length of the front porch period is equal to or shorter than a length of a front porch period of the preceding frame. As a result, the time point of the start of the read-out operation of the image data is made to come earlier.

Consequently, written data can be outputted after the possible shortest time.

On the other hand, in a case where the determination section 34 determines that the time point of the start of the write-in operation is not in a period between the time point of the end of the dangerous period and the time point of the end of the read-out operation of the preceding image data of the preceding frame of the image data, the period control section 33 illustrated in FIG. 1 adjusts the front porch period so that the front porch period is equal to or longer than that of the preceding frame (See FIG. 4 and the description above on the operation of the period control section 33). This makes it possible to automatically reduce a power consumption in a case where the data is not written.

(Flow in Case where Transfer of Image Data is Started Substantially at Scheduled Time Point for Starting Read-Out Operation)

(d) of FIG. 3 shows an example operation of a case where transfer of the image data from the host processor 2 to the LCD controller 3 is started, substantially at a scheduled time point for starting the read-out operation.

In this case, the time point of the start of the write-in operation is in a period after the time point of the start of the vertical synchronization signal indicative of the start of the read-out operation and before the start of the read-out operation. In this case, the time point of the start of the write-in operation is determined to be in the dangerous period and then the operation of the line counter is temporarily suspended for the delay period so that the time point of the start of the read-out operation is delayed (the delay control), as in the case of (b) of FIG. 3. In this case, though tearing is prevented, a width of the vertical synchronization signal for output (the vertical synchronization signal pulse period) or the back porch period (the vertical back porch period) is prolonged by the delay period. This case newly causes a problem that such a prolonged width or period becomes a cause of a malfunction of a subsequent circuit, particularly a malfunction of an LCD driver circuit (not illustrated in drawing) in the LCD4. In this way, a change in the VP (the width of the vertical synchronization signal) and the VB (the vertical back porch period) may not be desirable. FIG. 5 illustrates an embodiment that can receive the benefit of the present invention while no change occurs in the VP period and the VB period.

(Problem in Delay Control Described in (d) of FIG. 3 Above and Outline of Method to Solve Problem)

Next, the following discusses a problem of the delay control illustrated in the (d) of FIG. 3 and an outline of a method to solve the problem, with reference to (d) of FIG. 3, and (a) and (c) of FIG. 5. FIG. 5 is a diagram for illustrating a shifting amount in a case where the time point of the start of the write-in operation to the frame memory 31 is shifted. Moreover, (a) of FIG. 5 is a diagram for illustrating the above shifting amount in a case where Tin>Tout.

In the delay control described in the above (d) of FIG. 3, a length of the VP+VB period may be changed due to the delay of the time point of the start of the read-out operation.

When the above change in the length of the VP+VB period may result in a malfunction of the liquid crystal driver, as described above.

In view of this, the following discusses an outline of solution to such a problem.

In a graph of (a) of FIG. 5, a horizontal axis represents a time unit, while a vertical axis represents a unit of line position for writing or reading the image data in the frame memory 31 in the present embodiment. In (a) of FIG. 5, "VW" represents a width of the vertical synchronization period (in (a) of FIG. 5, the total number of lines of the image data in the frame memory 31), while "VP+VB" represents the length of the VP+VB period (in (a) of FIG. 5, the number of lines in the frame memory 31). For simplification of the following description, the number of frame lines is used as a unit for measuring a storage capacity of the frame memory 31; however, such a unit of the storage capacity is not limited to the number of frame lines. For example, a unit of byte can directly be used as the unit of the storage capacity.

Further, "rp" means a read pointer (a position in the frame memory 31 at which position the data is currently being read-out) and "wp" means a write pointer (a position in the frame memory 31 at which position the data is currently written in). "Tvp+Tvb" means the VP+VB period. This Tvp+Tvb is the shifting period in the embodiment illustrated in (a) of FIG. 5. As long as the shifting period includes at least the "Tvp+Tvb" (the VP+VB period), the shifting period can be set with a given margin so as to be longer than "Tvp+Tvb".

The graph in (a) of FIG. 5 shows shifts of the rp and the wp against elapsed time. The broken line of the wp corresponds to a state in which a process of shifting the start position of the write-in operation has not yet been performed, and the solid line of the wp corresponds to a state in which the process of shifting the start position of the write-in operation has been performed.

In the graph of (a) of FIG. 5, the broken line of the wp intersects with the solid line of the rp at a point P1. This means that tearing occurs at the point P1.

In the case of (a) of FIG. 5, the shifting amount (the given shifting amount, the number of lines in this case) of the write-in start position in the frame memory 31 is an amount that is predetermined so as not to exceed a capacity reserved in advance in the frame memory 31. In the present embodiment, this shifting amount is given by "a product of (i) the length of the VP+VB period and (ii) a ratio of a length of the read-out period to a length of the write-in period"=(VP+VB)×(Tout/Tin). The solid line of the wp in the graph is obtained, by parallel shift of the broken line of the wp in the graph by the shifting amount and the above shifting period. As long as the shifting amount is equal to or larger than (VP+VB)×(Tout/Tin), the shifting amount can be set with a given margin so as to be larger than the above shifting amount.

Meanwhile, the solid line of the wp and the solid line of the rp in the graph does not intersect with each other. This means that the occurrence of tearing is avoided.

That is, in a case where the speed of the read-out operation is faster than the speed of the write-in operation, tearing is avoidable by carrying out the process of shifting, by the above shifting amount, the start position of the write-in operation to the frame memory 31. In this case, it is not necessary to temporarily suspend the read-out operation for avoiding tearing even when the write-in operation is started within the shifting period.

Thereby, the process of shifting the start position of the write-in operation to the frame memory 31 is performed so that the wp does not overtake the rp and neither does the rp overtake the wp. This allows avoiding the occurrence of tearing.

The above is summarized as follows. That is, first, the dangerous period is set to a period that is from a time point obtained by going back by the length of the write-in period from the time point of the end of the read-out operation to a time point of a start of a vertical synchronization signal Vsync. Then, in a case where the write-in operation is started in the dangerous period, an operation for temporarily suspending the above line counter is performed. Meanwhile, in a case where the write-in operation is started within the VP+VB period, that is, the shifting period, the process for shifting the write-in start position is performed. This makes it possible to avoid tearing while making no change in the VP+VB period, only by reserving an extra memory capacity needed for the minimum shifting amount.

Further, in the above process, the start position of the write-in operation to the frame memory 31 is shifted. This eliminates the necessity of causing the host to wait to transfer the data, so that tearing can be avoided while no unnecessary waiting time occurs. Hence, it is not necessary to wait to transfer data until a safe time comes, every time the image data from the host processor 2 is updated. Consequently, no waiting time occurs for avoiding tearing.

Further, since no waiting time occurs, neither a drop frame in the shifting period nor an unnecessary power consumption, like a power consumption during the waiting time of the host processor 2, occurs.

Moreover, in the above process, the lengths of the vertical synchronization pulse period (hereinafter, referred to simply as "VP period") and the vertical back porch period (hereinafter, referred to simply as "VB period") do not change. This results in no malfunction of the liquid crystal driver caused by a change in the lengths of the VP period and the VB period.

The above configuration allows (i) avoiding a drop frame, (ii) reducing an unnecessary power consumption, and (iii) avoiding the occurrence of tearing as well as a change in a period of a sum of a vertical synchronization pulse period and a vertical back porch period. Further, as a secondary effect, display presentation is carried out without a waiting time, at the timing intended by the host processor 2. Accordingly, frame timing jitter of a moving image is eliminated. This consequently eliminates a motion-judder phenomenon.

Further, as described above, an increment in storage capacity of the frame memory 31 for avoiding the overtaking phenomenon can be substantially minimized when the shifting mount=(VP+VB)×(Tout/Tin). This shifting amount is smaller than a storage capacity of 1 frame (1 storage unit) in the frame memory 31. This allows suppressing the increment in the storage capacity of the frame memory which increment is intended to avoid the overtaking phenomenon.

Next, with reference to (c) of FIG. 5, the following discusses the increment in the storage capacity (herein, indicated by the number of lines) in the frame memory 31, which increment accompanies the above process for avoiding tearing.

Arrows that do not fold back in (c) of FIG. 5 each conceptually show a range in which a write-in position of image data is shifted in an initial state the above process of shifting a start position of the above write-in operation has not yet been performed. On the other hand, arrows that fold back each conceptually show a range in which a write-in position of the data is shifted after the above process of shifting the start position of the above write-in operation has been performed. (c) of FIG. 5 shows an address map of the frame memory 31 and the arrows each show a shift in write-in address. The first and second write-in operations start from the beginning of the frame memory in the initial state, because the time point of the start of the write-in operation is not in the shifting period. Then, no write-in operation is carried out to an area corresponding to the shifting amount at the end of the frame memory 31. Assuming here that the third write-in operation starts in the shifting period, the write-in operation starts at an address that is shifted by the shifting amount to a negative direction (upward in the address map) from the initial write-in position. Note that the frame memory 31 of the present embodiment is configured as a ring buffer, and accordingly, the first and the last of the frame memory 31 are logically connected so that addresses are managed as a ring-form object. In other words, an operation of shifting the write-in start position (the beginning of the frame memory 31) in the initial state upward means shifting the write-in start position by the shifting amount to an upper position from the last address in the memory map. From thus shifted write-in start position, the third write-in operation starts. In this third write-in operation, the frame memory 31 is accessed as a ring buffer, so that the frame memory 31 is accessed again by turning back. As to the fourth write-in operation, the write-in start position is not in the shifting period, and therefore, the fourth write-in operation starts from the same address as the third write-in operation.

(c) of FIG. 5 conceptually shows a state in which the storage capacity of the frame memory 31 is extended only by the above shifting amount, as compared to a storage capacity (for one frame of image data) in a case where the above shifting process is not performed. By extending the storage capacity of the frame memory 31 by the above shifting amount as described above, it becomes possible to completely avoid tearing while not at all causing the host processor 2 to wait in the VP+VB period.

In the above case, the storage capacity of the frame memory 31 can be arranged to be smaller than a storage capacity of 2 frames of normal image data. This is for the following reason. That is, the number of lines in the VP+VB period is normally much lower than the number VW of effective image lines. Further, since Tin>Tout and thus, (Tout/Tin)<1, the shifting amount (VP+VB)×(Tout/Tin) takes a much smaller value as compared to VW. Therefore, unlike the technique disclosed in Patent Literature 3, the configuration of the present embodiment allows suppressing the increment in the storage capacity of the frame memory which increment is intended to avoid the overtaking phenomenon, to a storage capacity smaller than that of 1 frame (1 storage unit).

(Entire Flow of Delay Control and Write-in Start Position Control)

Next, with reference to FIG. 6, the following discusses an entire flow of a case where the above write-in start position control is performed in addition to the delay control in a case where the write-in period Tin is longer than the read-out period Tout.

In the step S71 (hereinafter, referred to simply as "S71") of FIG. 6, the LCD controller 3 waits until generation of a start event of an image input from the host processor 2, and then, a control process proceeds to S72. The "start event of the image input" is, for example, reception of information that is always transferred in advance of the write-in operation of the image data. In the present embodiment, the following describes, as one example, a case where the information is a VSS (Vertical Sync Start) packet in a DSI (Display Serial Interface) video mode of an MIPI (Mobile Industry Processor Interface) video mode. However, the information is not limited to this example.

Other specific examples of the "information that is always transferred in advance of the write-in operation of the data" encompasses a write memory start command in a DCS (display command set) command of the MIPI command mode, the start of the vertical synchronization signal Vsync in an parallel/LVDS (Low-Voltage Differential Signaling) input, and a BS (Blanking Start) packet of a DP (Display Port).

In S72, the determination section 34 determines whether or not the time point of the start of the write-in operation (a time point indicated by a downward arrow of an DSI input in FIG. 3) is in a period between the time point of the start of the dangerous period and the time point of the end of the read-out operation. In accordance with a result of this determination, when the time point of the start of the write-in operation is determined to be in the period between the time point of the start of the dangerous period and the time point of the end of the read-out operation, then the control process proceeds to S73 (YES). On the other hand, when the start position of the write-in operation is determined to be not in the period between the time point of the start of the dangerous period and the time point of the end of the read-out operation, the control process proceeds to S74 (NO).

In S73, the period control section 33 changes the above-described set VF period to VF(n)=VF(min), and then, the control process proceeds to S74.

In S74, the determination section 34 determines whether or not the time point of the start of the write-in operation (the time point indicated by the downward arrow of the DSI input in FIG. 3) is in the dangerous period. In accordance with a result of this determination, when the time point of the start of the write-in operation is determined to be in the dangerous period, the control process proceeds to S75 (YES). On the other hand, when the time point of the start of the write-in operation is determined to be not in the dangerous period, the control process then proceeds to S91 (NO).

In S75, the delay control section 32 temporarily suspends, for the above delay period, the line counter that generates a line address at the time when the image data is to be transferred to the LCD controller 3, so as to delay the time point of the start of the read-out operation. Then, the control process proceeds to S76.

In S76, the image transfer system 1 stands by for a period of both the above delay time and the set VF period. After the delay time and the preset VF period have elapsed, the control process proceeds to S77.

In S77, the delay control section 32 releases the above temporary suspension of the line counter, and then causes the operation of the line counter to resume.

In S91, the determination section 34 determines whether or not the time point of the start of the write-in operation is in a given shifting period (in the present embodiment, the VP+VB period). In accordance with a result of the determination, when the time point of the start of the write-in operation is determined to be in the VP+VB period, the determination section 34 notifies this determination to the write-in start position control section 36 and the read-put start position control section 37. Then, the control process proceeds to S92 (YES). On the other hand, when the time point of the start of the write-in operation is determined to be not in the VP+VB period, the control process returns back to S71 (NO).

In S92, the write-in start position control section 36 starts the write-in operation of the image data from a position that is shifted by only the above shifting amount from the write-in start position in the frame memory 31 (VRAM). Then, the control process proceeds to S93.

In S93, a position from which the read-out operation of next image data is to be started is set to the same position as the position that is shifted by only the above shifting amount from the write-in start position in the frame memory 31 (VRAM). Then, the control process returns back to S71.

(In Case where Write-in Period Tin<the Read-Out Period Tout)

Figure 7:
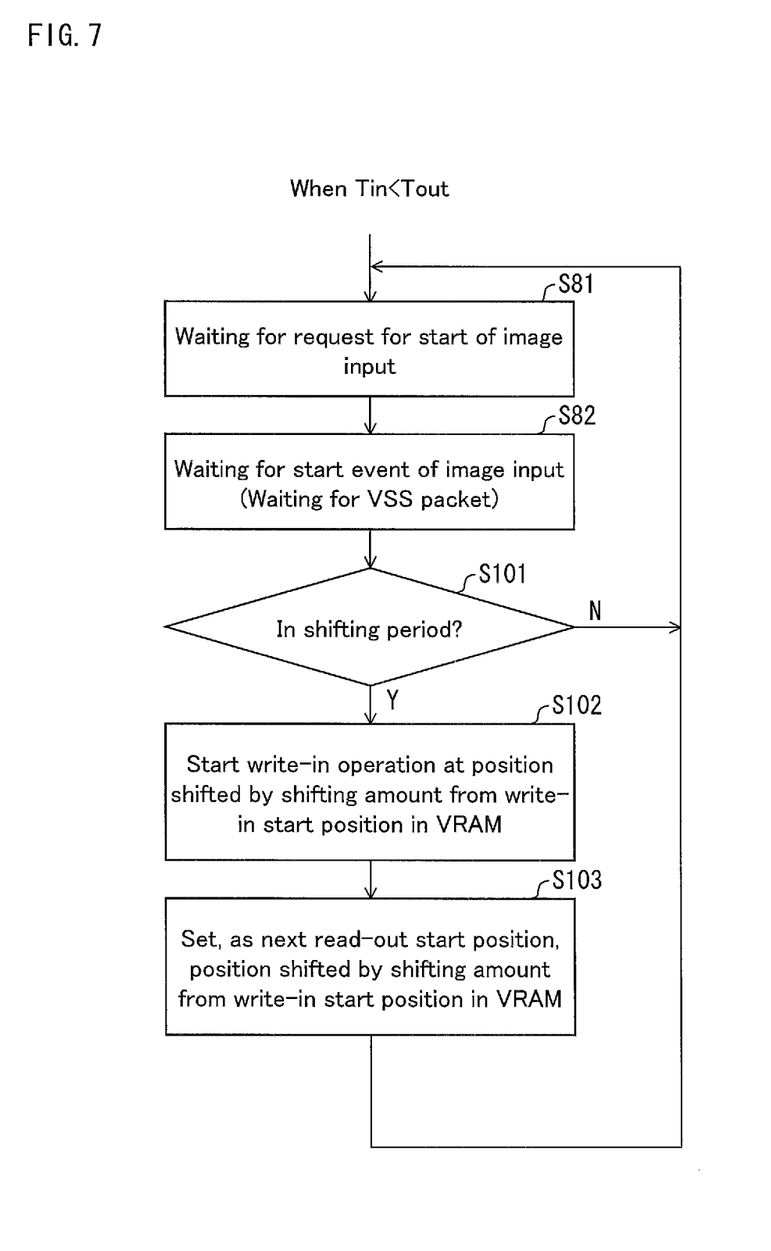
FIG. 7 is a flowchart illustrating an example featuring operation of the above memory control device in a case where Tin<Tout.

Next, with referenced to FIGS. 5 and 7, the following discusses a featuring operation of the image transfer system 1 in a case where the write-in period Tin is shorter than the read-out period Tout.

In the following description, as in the above description, the term "shifting period" is defined as a period in which it is highly likely that tearing occurs. More specifically, in a case where the speed of the read-out operation is slower than the speed of the write-in operation as in the present embodiment, the "shifting period" is set to a period from the time point of the start of the read-out operation to the time point obtained by going back by the length of the write-in period from the time point of the end of the read-out operation.

(Entire Flow of Write-in Start Position Control)

Next, with reference to FIG. 7, the following discusses an entire flow of a case where the write-in start position control is carried out in a case where the write-in period Tin is shorter than the read-out period Tout. FIG. 7 is a flowchart that shows an example featuring operation of the image transfer system 1 in a case where Tin<Tout.

In S81 of FIG. 7, a request for starting input of the image data from the host processor 2 is waited, and when the request is made, a control process proceeds to S82. In S82, the LCD controller 3 waits until generation of a start event of an image input (for example, reception of information that is always transferred in advance of the write-in operation of the image data) from the host processor 2, and then, the control process proceeds to S101. In the present embodiment, the following describes, as one example, a case where the information is a VSS packet in the DSI video mode of the MIPI video mode. However, the information is not limited to this example.

In S101, the determination section 34 determines whether or not the time point of the start of the write-in operation is in the shifting period. In accordance with a result of this determination, when the time point of the start of the write-in operation is determined to be in the shifting period, the control process proceeds to S102 (YES). On the other hand, when the time point of the start of the write-in operation is determined to be not in the shifting period, the control process then returns back to S81 (NO).

In S102, the write-in start position control section 36 starts the write-in operation of the image data from a position that is shifted by only the above shifting amount from a scheduled write-in start position in the frame memory 31 (VRAM). Then, the control process proceeds to S103.

In S103, the read-out operation of the image data is started from a position that is the same as the position that is shifted by the above shifting amount from the write-in start position in the frame memory 31 (VRAM). Then, when the read-out operation ends, the control process returns back to S81.

(Effects of Image Transfer System 1)

In the image transfer system 1, when the speed of the read-out operation is faster than the speed of the write-in operation, the time point of the start of the read-out operation is delayed by a given delay period that is predetermined in advance in accordance with a period that corresponds to a difference between the speed of the read-out operation and the speed of the write-in operation (=difference between the read-out period and the write-in period). On the other hand, when the speed of the read-out operation is slower than the speed of the write-in operation, the time point of the start of the write-in operation is delayed by a given delay period that is predetermined in advance in accordance with a period that substantially corresponds to the difference between the speed of the read-out operation and the speed of the write-in operation. This allows avoiding starting the read-out operation or the write-in operation in the period in which it is highly likely that tearing occurs. Hence, tearing can be avoided while no waiting time occurs in a period except for the dangerous period. This eliminates the necessity of causing the host processor 2 to wait to transfer image data until a safe time comes, every time the image data is updated by the host processor 2. Consequently, unlike the conventional technique, no unnecessary waiting time occurs.

Moreover, unlike the conventional technique, neither a drop frame nor an unnecessary power consumption, like a power consumption during the waiting time of the host processor 2, occurs because no unnecessary waiting time occurs.

This allows avoiding the occurrence of a drop frame and also reducing an unnecessary power consumption such as a power consumption during the waiting time of the host processor 2.

Furthermore, when the speed of the read-out operation is faster than the speed of the write-in operation or when the speed of the read-out operation is slower than the speed of the write-in operation, the image transfer system 1 performs the process of shifting the start position of the write-in operation to the frame memory 31 by a given shifting amount that is predetermined in advance in accordance with either a difference between the read-out period and the write-in period or the VP+VB period. Hence, tearing is avoided in the given shifting period.

Further, in the above process, as a result of shifting the start position of the write-in operation to the frame memory 31, it becomes unnecessary to cause the host processor 2 to wait to transfer image data. This allows avoiding the occurrence of tearing while causing no unnecessary waiting time in the shifting period. Therefore, it is not necessary to cause the host processor 2 to wait to transfer the image until a safe time comes, every time the start position of the write-in operation comes in the shifting period. Hence, no waiting time occurs for avoiding tearing in the shifting period.

Furthermore, because no waiting time occurs, neither a drop frame in the shifting period nor an unnecessary power consumption during the waiting time of the host processor 2 occurs.

Further, as mentioned above, the shifting amount can be predetermined in advance in accordance with the VP+VB period, the read-out period and the write-in period. Even if the shifting amount is predetermined in accordance with a simple sum of lengths of these three periods, the shifting amount is still less than the storage capacity of 1 frame in the frame memory 31. This allows suppressing an increment in the storage capacity of the frame memory 31 which increment is intended to avoid the overtaking phenomenon.

The above configuration allows (i) avoiding a drop frame, (ii) reducing an unnecessary power consumption (such as a power consumption during the waiting time of the host processor 2), and (iii) suppressing an increment in storage capacity which increment is intended to avoid the overtaking phenomenon.

Furthermore, in the above process, the VP period and the VB period do not change in length. Thus, the liquid crystal driver do not malfunction due to a change in length of the VP period and the VB period.

In other words, the write-in operation can be performed anytime while the host processor 2 is not at all caused to wait, only by reserving a storage capacity of the frame memory 31 which storage capacity is slightly bigger than a storage capacity for a screen size. In addition, no tearing occurs in such a configuration. Furthermore, the liquid crystal does not malfunction because neither the VP period nor the VB period changes.

Moreover, when the start point of the start of the write-in operation for data from the host processor 2 is in either the VP period or the VB period of the read-out operation, or when the speed of the write-in operation is faster than the speed of the read-out operation, the host processor 2 does not need to wait.

Further, because the host processor 2 does not have to wait, the occurrence of judder can be suppressed. This makes it possible to prevent a drop frame, and also to prolong a period of a sleep state of the host processor 2 and accordingly reduce a total power consumption.

Furthermore, because display presentation is carried out without a waiting time at the timing intended by the host processor 2, frame timing jitter of a moving image is eliminated. This consequently eliminates a motion-judder phenomenon.

Moreover, image update can be reflected on a display immediately after the image update. Accordingly, by automatically making a liquid crystal driving cycle longer in a case where there is no image update, it is also possible to realize a function to automatically reduce a power consumption. This allows automatic control of a driving method that is suitable for an oxide semiconductor liquid crystal panel.

[Mobile Terminal 10]

Figure 2:
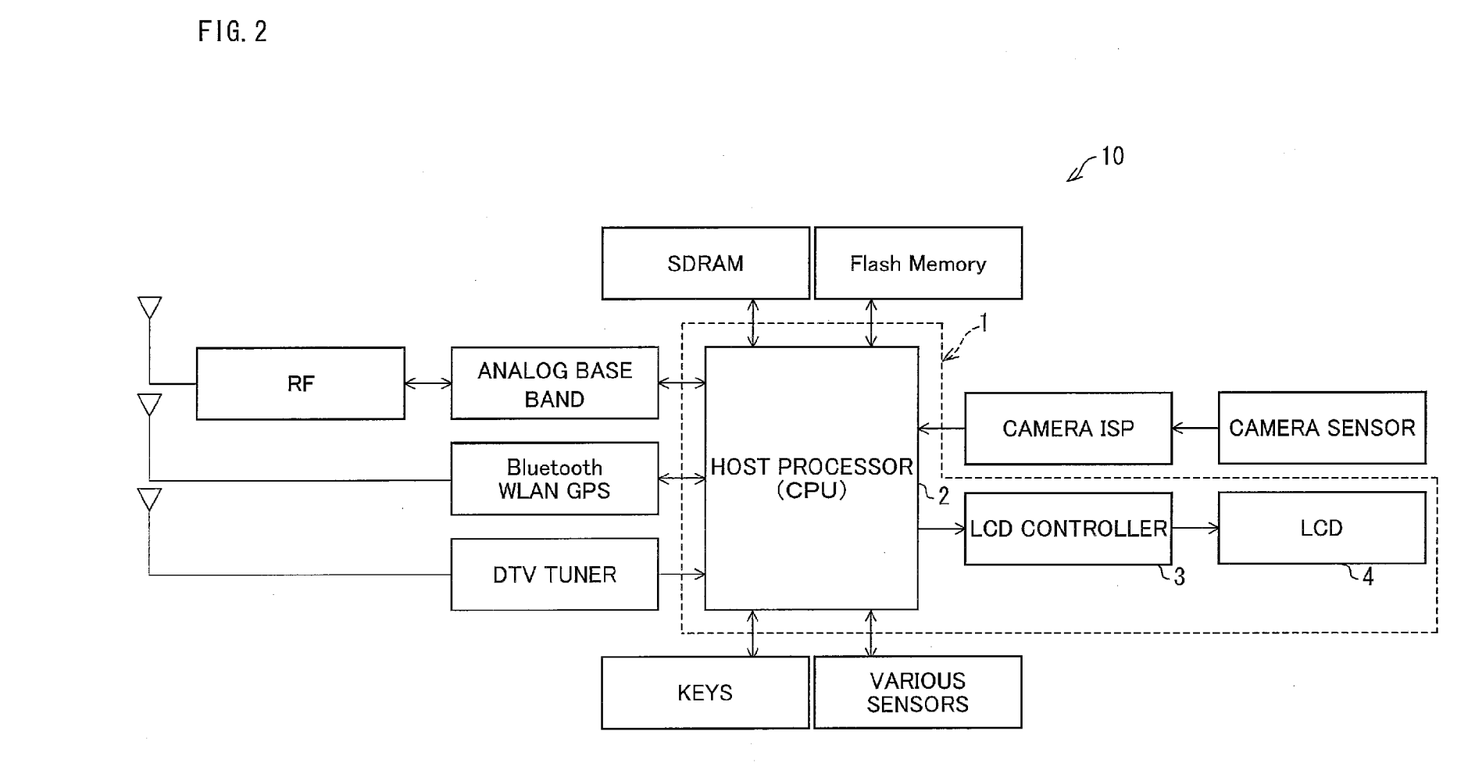
FIG. 2 is a block diagram illustrating a mobile terminal (including the above memory control device) of one embodiment of the present invention.

Next, with reference to FIG. 2, the following discusses the mobile terminal 10 as another embodiment of the present invention. FIG. 2 is a block diagram illustrating an entire configuration of the mobile terminal 10 having the above image transfer system 1.

As illustrated in FIG. 2, the mobile terminal 10 includes, in addition to the above image transfer system 1, an SDRAM, a Flash Memory, a camera sensor, a camera ISP, an RF, an analog base band, Bluethooth (Registered Trademark), a WLAN, a GPS (Global Positioning System), a DTV tuner, keys, various sensors, etc. However, the configurations other than that of the image transfer system 1 are not relevant to the essence of the present invention, and therefore, the descriptions of such configurations are omitted herein.

(Effects of Mobile Terminal 10)

The mobile terminal 10 of the present embodiment includes the above image transfer system 1. Therefore, the mobile terminal 10 can realize a mobile terminal that is capable of (i) avoiding a drop frame, (ii) reducing an unnecessary power consumption such as a power consumption during a waiting time of the host processor 2, and (iii) avoiding the occurrence of tearing as well as a change in a sum of a vertical synchronization signal pulse period and a vertical back porch period. Effects other than those mentioned above are as described in the above section (Effects of Image Transfer System 1), and so descriptions thereof are omitted here.

[Examples Realized by Software]

Lastly, each block of the image transfer system 1, in particular, each block of the LCD controller 3, can be realized by way of hardware with use of a logical circuit formed on an integrated circuit (IC chip) or by way of software as executed by a CPU (Central Processing Unit).

In the latter case where software is used, the image transfer system 1 includes a CPU (central processing unit) and memory devices (memory media). The CPU (central processing unit) executes instructions in programs for realizing each function. The memory devices include a ROM (read only memory) which contains programs, a RAM (random access memory) to which the programs are loaded, and a memory containing the programs and various data. The objective of the present invention can also be achieved by mounting to the image transfer system 1 a computer-readable storage medium containing control program code (executable program, intermediate code program, or source program) for the image transfer system 1, which is software realizing the aforementioned functions, in order for the computer (or CPU, MPU) to retrieve and execute the program code contained in the storage medium.

The storage medium may be any of various kinds of non-transitory tangible media, such as tapes (a magnetic tape, a cassette tape, etc.), disks including magnetic disks (a floppy (Registered Trademark) disk, a hard disk, etc.) and optical disks (a CD-ROM, an MO, an MD, a DVD, a CD-R, etc.), cards (IC cards including a memory card, an optical card, etc.), semiconductor memories (a mask ROM, an EPROM, an EEPROM®, a flash ROM, etc.) and logical circuits such as a PLD (a Programmable logic device) and an FPGA (a Field Programmable Gate Array), and the like.

The image transfer system 1 may be arranged to be connectable to a communications network so that the program code may be delivered over the communications network. This communications network is not particularly limited as long as the communications network is capable of transmitting the program codes. The communications network may be, for example, the Internet, an intranet, an extranet, a LAN, an ISDN, a VAN, a CATV communications network, a virtual dedicated network (virtual private network), a telephone line network, a mobile communications network or a satellite communications network. The transfer medium which makes up the communications network is not limited to any particular configuration or type, as long as the transfer medium is capable of transferring the program codes. The transfer medium may be, for example, wired line, such as IEEE 1394, USB, electric power line, cable TV line, telephone line, or ADSL line (Asymmetric Digital Subscriber Line); or wireless, such as infrared radiation (IrDA, remote control), Bluetooth (Registered Trademark), IEEE802.11 wireless, HDR (High Data Rate), NFC (Near Field Communication), DLNA® (Digital Living Network Alliance), mobile telephone network, satellite line, or terrestrial digital network. The present invention encompasses a computer data signal which is embedded in a carrier wave and in which computer data signal the program code is embodied electronically.

CONCLUSION

In other words, the memory control device according to one embodiment of the present invention includes: a memory control device that performs (a) a write-in operation for writing, to a frame memory, data transferred from a host and (b) a read-out operation for reading the data written in the frame memory and then transferring this data to a display control section, and the memory control device including, a write-in start position control section performing a process of shifting, by a given shifting amount, a start position of the write-in operation to the frame memory, the given shifting amount being predetermined so as not to exceed a capacity reserved in advance in the frame memory in a case where (i) a read-out period from a start to an end of the read-out operation is different in length from a write-in period from a start to an end of the write-in operation and (ii) the write-in operation is started.

According to the above configuration, in a case where (i) the read-out period from the start to the end of the read-out operation is different in length from the write-in period from the start to the end of the write-in operation and (ii) the write-in operation is started, the write-in start position control section performs the process of shifting, by the given shifting amount, the above start position of the write-in operation to the above frame memory. This given shifting amount is an amount that is predetermined in advance so as not to exceed the capacity reserved in advance in the above frame memory.

Hence, in a case where (i) a speed of the read-out operation is faster than a speed of the write-in operation or the speed of the read-out operation is slower than the speed of the write-in operation and (ii) the write-in operation is started, in other words, update of the data from the host is started, the process of shifting, by the given shifting amount, the start position of the write-in operation to the frame memory is performed.

This allows avoiding the occurrence of tearing, by performing the process of shifting the start position of the write-in operation to the frame memory so that a read pointer (hereinafter, referred to simply as "rp") showing a current read-out position in the frame memory does not overtake a write pointer (hereinafter, referred to simply as "wp") showing a current write-in position in the frame memory and neither does the wp does not overtake the rp.

In the above process, the host does not need to wait to transfer the data as a result of shifting the start position of the write-in operation to the frame memory. This allows avoiding the occurrence of tearing while no unnecessary waiting time occurs. Consequently, it is not necessary to cause the host to wait to transfer the data until a safe time comes, every time the data from the host is updated. Hence, no waiting time occurs for avoiding the occurrence of tearing.

Further, because no waiting time occurs, neither a drop frame nor an unnecessary power consumption like a power consumption during the time of the host occurs.

Furthermore, in the above process, because a vertical synchronization signal pulse period (hereinafter, referred to simply as "VP period") and a vertical back porch period (hereinafter, referred to simply as "VB period") do not change in length, no malfunction of a liquid crystal driver occurs due to a change in length of the VP period and the VB period.

The above configuration allows (i) avoiding a drop frame, (ii) reducing an unnecessary power consumption, and (iii) avoiding the occurrence of tearing as well as a change in a period of a sum of a vertical synchronization pulse period and a vertical back porch period. Further, as a secondary effect, display presentation is carried out without a waiting time at the timing intended by the host. Accordingly, frame timing jitter of a moving image is eliminated. This consequently eliminates a motion-judder phenomenon.

The memory control device according to one embodiment of the present invention may be arranged to further include: a determination section that at least determines whether or not a time point of the start of the write-in operation is in the shifting period predetermined in accordance with either a difference between the read-out period and the write-in period or a period of a sum of a vertical synchronization signal pulse period and a vertical back porch period in the read-out operation, and the process of shifting the start position of the write-in operation being performed in a case where the determination section has determined that the time point of the start of the write-in operation is in the shifting period.

According to the above configuration, the determination section at least determines whether or not the time point of the start of the write-in operation is in the given shifting period. Further, in a case where the start position of the write-in operation is determined to be in the shifting period, the write-in start position control section performs the process of shifting, by the given shifting amount, the start position of the write-in operation to the frame memory. In this case, the "shifting period" is a period that is predetermined in advance in accordance with either a difference between the read-out period and the write-in period or a period of a sum of the vertical synchronization signal period and the vertical back porch period of the read-out operation (hereinafter, referred to simply as "VP+VB period"). In addition, the "shifting amount" is predetermined in advance in accordance with the VP+VB period, the read-out period and the write-in period.

Accordingly, when the speed of the read-out operation is faster than the speed of the write-in operation, or when the speed of the read-out operation is slower than the speed of the write-in operation, the process of shifting, by the given shifting amount, the start position of the write-in operation to the frame memory is performed. This allows avoiding the occurrence of tearing in the shifting period.

In the above process, it becomes unnecessary to cause the host to wait to transfer the data because the start position of the write-in operation to the frame memory is shifted. Accordingly, tearing can be avoided while no unnecessary waiting time occurs in the shifting period. Further, it becomes unnecessary to cause the host to wait to transfer the data until a safe time comes, every time the time point of the write-in operation comes in the shifting period. Thus, no waiting time occurs for avoiding tearing in the shifting period.

Further, because no waiting time occurs, neither a drop frame in the shifting period nor an unnecessary power consumption such as a power consumption during the waiting time of the host occurs.

In addition, in the above process, the VP period and the VB period do not change in length. Therefore, no malfunction of the liquid crystal driver occurs due to a change in lengths of the VP period and the VB period.

Meanwhile, a technology disclosed in Patent Literature 3 has the following problem. That is, since addresses for a write-in operation and a read-out operation are separated from each other by shifting, by more than a storage unit, one of a write-in control signal and a read-out control signal from the other, an increment in storage capacity which increment is intended to avoid the overtaking phenomenon requires at least a storage unit or more.

However, as mentioned above, the shifting amount can be predetermined in advance in accordance with the VP+VB period, the write-in period and the read-out period. Further, even a simple sum of lengths of these periods does not reach a capacity of 1 frame in the frame memory. This allows suppressing an increment in the storage capacity of the frame memory which increment is intended to avoid the overtaking phenomenon.

Consequently, it becomes possible to (i) avoid a drop frame, (ii) reduce an unnecessary power consumption, and (iii) avoid the occurrence of tearing as well as a change in the period of the sum of the vertical synchronization signal pulse period and the vertical back porch period. In addition, it is also possible to suppress the increment in the storage capacity which increment is intended to avoid the overtaking phenomenon.

Further, the memory control device according to one embodiment of the present invention is arranged such that, in a case where a speed of the read-out operation is faster than a speed of the write-in operation, the shifting period is set to the period of the sum.

In the above configuration, in a case where the speed of the read-out operation is faster than the speed of the write-in operation, the possibility of the occurrence of tearing is high when the start position of the write-in operation comes in the shifting period.

Hence, the above configuration makes it possible to avoid tearing without causing the host to wait, in a case where the speed of the read-out operation is faster than the write-in operation.

The memory control device according to one embodiment of the present invention is arranged such that: in a case where a speed of the write-in operation is faster than a speed of the read-out operation, the shifting period is set to the period from a time point of the start of the read-out operation to a time point obtained by going back by a length of the write-in period from a time point of the end of the read-out operation.

According to above configuration, in a case where the speed of the read-out operation is slower than the speed of the write-in operation, the possibility of the occurrence of tearing becomes high when the start position of the write-in operation comes in the above shifting period.

Hence, according to the above configuration, in a case where the speed of the read-out operation is slower than the write-in operation, tearing can be avoided while the host is not caused to wait.

Further, the memory control device according to one embodiment of the present invention may be arranged such that: the shifting amount is predetermined in accordance with the period of the sum, the read-out period and the write-in period. More particularly, when the speed of the read-out operation is faster than the speed of the write-in operation, the shifting amount can be an amount that is predetermined in accordance with a product of the length of the above period of the sum and the ratio of the length of the write-in period and the length of the read-out period. On the other hand, when the speed of the write-in operation is faster than the read-out operation, the shifting amount can be an amount that is predetermined in advance in accordance with the product of the length of the above period of the sum and the ratio of the difference between the length of the read-out period and the length of the write-in period to the length of the read-out period.

When the shifting amount is determined in accordance with (a) the product of the length of the above period of the sum and the ratio of the length of the read-out period to the length of the write-in period or (b) the product of the length of the period of the sum and the ratio of the difference between the length of the read-out period and the length of the write-in period to the length of the read-out period, it is possible to suppress an increment in the storage capacity in the frame memory to substantially the minimum, which increment is intended to avoid the overtaking phenomenon.

Further, the memory control device according to one embodiment of the present invention is preferably arranged such that the frame memory has a storage capacity that is extended by at least the shifting amount beyond a storage capacity for 1 frame of the data.

According to the above configuration, tearing can be avoided while the host is not at all caused to wait in the shifting period.

Further, the memory control device according to one embodiment of the present invention is preferably arranged such that: the storage capacity of the frame memory is at least smaller than a capacity of 2 frames of the data.

The above configuration makes it possible to suppress, to smaller than the capacity of 2 frames, the increment of the storage capacity of the frame memory which increment is intended to avoid the overtaking phenomenon.

Further, preferably, the memory control device according to one embodiment of the present invention further includes: a read-out start position control section causing the read-out operation to start at a position that is the same as the start position of the write-in operation, which start position is shifted by the shifting amount in the frame memory, in a case where the write-in start position control section performs the process of shifting, by the given shifting amount, the start position of the write-in operation to the frame memory.

The above configuration makes it possible to avoid tearing and also avoid a state in which the data to be read is not stored at the start position of the read-out operation to the frame memory.

A mobile terminal according to one embodiment of the present invention preferably includes any of the above memory control devices.

The above configuration makes it possible to realize a mobile terminal capable of (i) avoiding a drop frame, (ii) reducing an unnecessary power consumption, and (iii) avoiding the occurrence of tearing as well as a change in the sum period of the vertical synchronization pulse period and the vertical back porch period.

Each section of the above frame memory control device can be realized by a computer. In this case, the present invention encompasses a memory control program for realizing the frame memory control device by causing the computer to function as each of the above section, and a computer-readable storage medium where the program is stored.

[Supplemental Matters]

The present invention is not limited to the description of the embodiments above, but may be altered by a skilled person within the scope of the claims. An embodiment based on a proper combination of technical means disclosed in different embodiments is encompassed in the technical scope of the present invention. Further, the technical means disclosed in different embodiments can be combined so as to form a new technical feature.

INDUSTRIAL APPLICABILITY

The present invention can be applied to such a memory control device that performs (a) a write-in operation for writing, to a frame memory, data transferred from a host processor and (b) a read-out operation for reading data written in the frame memory and then transferring thus read data to a display panel.

REFERENCE SIGNS LIST

1 Image transfer system
2 Host processor (host, memory control device)
3 LCD controller (memory control device)
4 LCD (display control section)
10 Mobile terminal
31 Frame memory
32 Delay control section (delay section)
33 Period control section
34 Determination section
35 Control register
36 Write-in start position control section
37 Read-out start position control section
Tin Write-in period
Tout Read-out period

The invention claimed is:

1. A memory control device that performs (a) a write-in operation for writing, to a frame memory, data transferred from a host and (b) a read-out operation for reading the data written in the frame memory and then transferring this data to display control circuitry, the memory control device comprising:
    write-in start position control circuitry that performs a process of shifting, by a given shifting amount, a start position of the write-in operation to the frame memory, the given shifting amount being predetermined so as not to exceed a capacity reserved in advance in the frame memory in a case where (i) a read-out period from a start to an end of the read-out operation is different in length from a write-in period from a start to an end of the write-in operation and (ii) the write-in operation is started; wherein
    the frame memory is a single memory which stores image data corresponding to one frame, and
    the frame memory has a storage capacity that is extended by at least the shifting amount beyond a storage capacity for 1 frame of the data.

2. The memory control device as set forth in claim 1, further comprising:
    determination circuitry that at least determines whether or not a time point of the start of the write-in operation is in the shifting period predetermined in accordance with either a difference between the read-out period and the write-in period or a period of a sum of a vertical synchronization signal pulse period and a vertical back porch period in the read-out operation,
    the process of shifting the start position of the write-in operation being performed in a case where the determination circuitry has determined that the time point of the start of the write-in operation is in the shifting period.

3. The memory control device as set forth in claim 2, wherein:
    in a case where a speed of the read-out operation is faster than a speed of the write-in operation, the shifting period is set to the period of the sum.

4. The memory control device as set forth in claim 2, wherein:
    in a case where a speed of the write-in operation is faster than a speed of the read-out operation, the shifting period is set to the period from a time point of the start of the read-out operation to a time point obtained by going back by a length of the write-in period from a time point of the end of the read-out operation.

5. The memory control device as set forth in claim 2, wherein:
    the shifting amount is predetermined in accordance with the period of the sum, the read-out period and the write-in period.

6. The memory control device as set forth in claim 2, wherein:
    the shifting amount is predetermined in accordance with a product of a length of the period of the sum and a ratio of a length of the read-out period to a length of the write-in period.

7. The memory control device as set forth in claim 1, wherein:
    the storage capacity of the frame memory is at least smaller than a storage capacity for 2 frames of the data.

8. The memory control device as set forth in claim 1, further comprising:
    read-out start position control circuitry that causes the read-out operation to start at a position that is the same as the start position of the write-in operation, which start position is shifted by the shifting amount in the frame memory, in a case where the write-in start position control circuitry performs the process of shifting, by the given shifting amount, the start position of the write-in operation to the frame memory.

9. A mobile terminal comprising the memory control device as set forth in claim 1.

10. A non-transitory computer-readable storage medium where a memory control program for causing a computer as function of the memory control device as set forth in claim 1 is stored.

* * * * *